(12) United States Patent
Kim (10) Patent No.: US 8,358,390 B2
(45) Date of Patent: Jan. 22, 2013

(54) POLARIZER AND METHOD FOR MANUFACTURING LIQUID CRYSTAL DISPLAY DEVICE USING THE SAME

(75) Inventor: Hong-Suk Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 149 days.

(21) Appl. No.: 11/810,367

(22) Filed: Jun. 5, 2007

(65) Prior Publication Data

US 2007/0279555 A1 Dec. 6, 2007

(30) Foreign Application Priority Data

Jun. 5, 2006 (KR) .................. 10-2006-0050571

(51) Int. Cl.
*G02F 1/1333* (2006.01)

(52) U.S. Cl. ........................................ 349/122

(58) Field of Classification Search .............. 349/122
See application file for complete search history.

(56) References Cited

U.S. PATENT DOCUMENTS

| | | | |
|---|---|---|---|
| 5,244,713 A * | 9/1993 | Nakamura et al. | 428/156 |
| 6,628,365 B1 * | 9/2003 | Park et al. | 349/153 |
| 6,967,703 B2 * | 11/2005 | Nam et al. | 349/153 |
| 7,553,390 B2 * | 6/2009 | Yamabuchi et al. | 156/257 |
| 2004/0112902 A1 * | 6/2004 | Campbell | 220/570 |
| 2006/0172117 A1 * | 8/2006 | Petersen | 428/138 |
| 2007/0022851 A1 * | 2/2007 | Garrec | 83/13 |
| 2007/0113873 A1 * | 5/2007 | Yang | 134/29 |

FOREIGN PATENT DOCUMENTS

| | | |
|---|---|---|
| JP | 10-307688 | 11/1998 |
| JP | 2000-111731 | 4/2000 |

OTHER PUBLICATIONS

Office Action issued in corresponding Korean Patent Application No. 10-2006-0050571, mailed Aug. 17, 2012.

\* cited by examiner

*Primary Examiner* — Mark Robinson
*Assistant Examiner* — Erin Chiem
(74) *Attorney, Agent, or Firm* — Brinks, Hofer, Gilson & Lione

(57) ABSTRACT

A polarizer of a liquid crystal display device and a method for manufacturing a liquid crystal display device using the same is disclosed. The polarizer includes a main body, a protection film on the main body, and a cutting line formed on the protection film. A method for manufacturing a liquid crystal display device includes providing a liquid crystal panel and a protection film having an active region and a dummy region, the protection film including at least a cutting line in the dummy region or a boundary area between the active region and the dummy region; attaching the protection film to a polarizer; attaching the polarizer to a liquid crystal panel; and, removing the dummy region of the protection film along the cutting line from the liquid crystal panel.

1 Claim, 11 Drawing Sheets

POLARIZER AND METHOD FOR MANUFACTURING LIQUID CRYSTAL DISPLAY DEVICE USING THE SAME

This application claims the benefit of Korean Patent Application No.: 050571/2006, filed on Jun. 5, 2006, which is incorporated herein by reference.

TECHNICAL FIELD

The present application relates to a polarizer and a method for manufacturing a liquid crystal display device using the same and, more particularly, to a polarizer attached to a protection film having a cutting line.

BACKGROUND

With the rapid development in the field of information and communication, the importance of a display device for displaying a variety of information has recently been increased. A cathode ray tube (CRT) cannot satisfy the recent trend of devices needing to be light weight with minimal thickness. In response to such a is trend, flat displays such as an LCD (Liquid Crystal Display), a PDP (Plasma Display Panel), an ELD (Electro Luminescence Display), and the like, have been developed, and much research and development thereof have been actively performed.

In particular, the liquid crystal display (LCD) device is a display device that has advantages, including being light in weight, thin in thickness, and low in power consumption. With these advantages, liquid crystal display devices are implemented in not only a display device for a notebook computer but also a desktop computer, a large-screen TV, and the like, and the demand for the liquid crystal display devices continue to increase.

Figure 1:
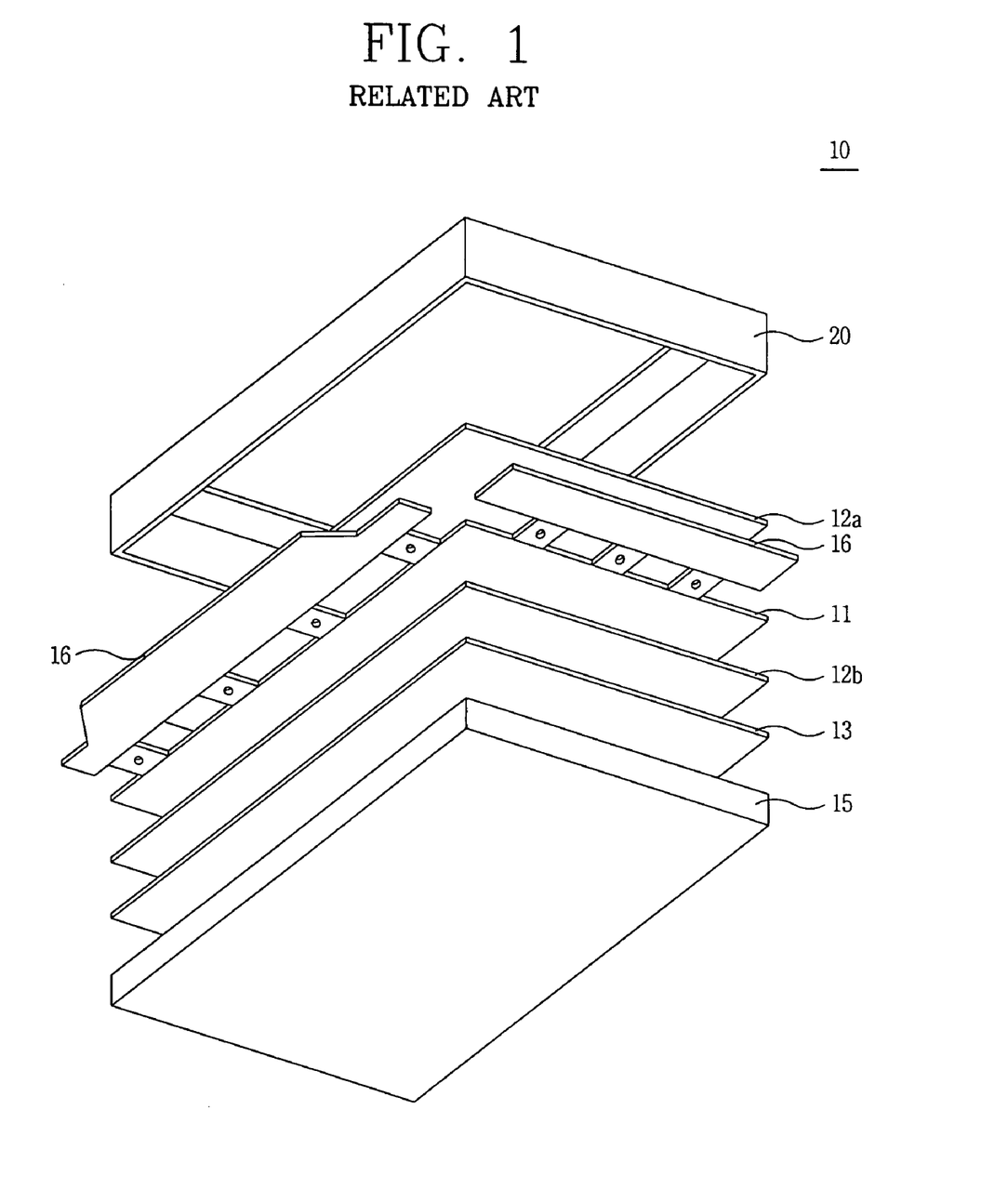
FIG. 1 is an exploded perspective view showing the related art liquid crystal display module (LCM)

FIG. 1 is an exploded perspective view showing a liquid crystal display module (LCM). The liquid crystal display module 10 includes a liquid crystal panel 11, a backlight unit 15, a board assembly unit 16 for driving the liquid crystal panel 11, and a top case 20. A pair of polarizers 12a and 12b is mounted on both surfaces of the liquid crystal panel 11, and the backlight unit 15 is disposed below the liquid crystal panel 11 for providing a transmitted light.

An optical sheet 13 is disposed between the backlight unit 15 and the liquid crystal panel 11 so as to improve efficiency of the transmitted light.

The top case 20 is provided above the liquid crystal panel 11, and a region thereof is assembled by being overlapped with an edge of the liquid crystal panel 11.

Since the liquid crystal material does not have a self-light-emitting characteristic, a luminescent lamp or light source is required to produce an easily visible image. In order to control the intensity of the transmitted light, the polarizers 12a and 12b being crossed perpendicular to a light transmission axis and attached is to the both surfaces of the liquid crystal panel. Accordingly, while passing through the liquid crystal panel 11, the intensity of the transmitted light is controlled by a rotation degree of the polarization axis, thereby resulting in intensities ranging from black to white.

The polarizers 12a and 12b include a main body and protection films on the main body (not shown). The protection films for protecting the main body are on both surfaces of the polarizer. One of the protection films removed in order to attach the polarizer onto the liquid crystal panel later referred to as a release film.

The release film is removed before the polarizer is attached on to the liquid crystal panel 11. Then, the polarizers 12a and 12b are attached on to the surfaces of the liquid crystal panel 11.

However, when the liquid crystal panel 11 attached onto the polarizers 12a and 12b and the top case 20 are to be assembled into the liquid crystal display module 10, some regions of the liquid crystal panel 11 may be covered by the top case 20, thereby making it impossible to remove the protection film after assembly into the module 10. Accordingly, the front surface protection film is removed when the liquid crystal panel 11, the top case 20, the backlight unit 15, and other components, are assembled into the liquid crystal display module 10, then a protection film is reattached so as to protect the polarizer after the liquid crystal display module 10 is completed.

Figure 2:
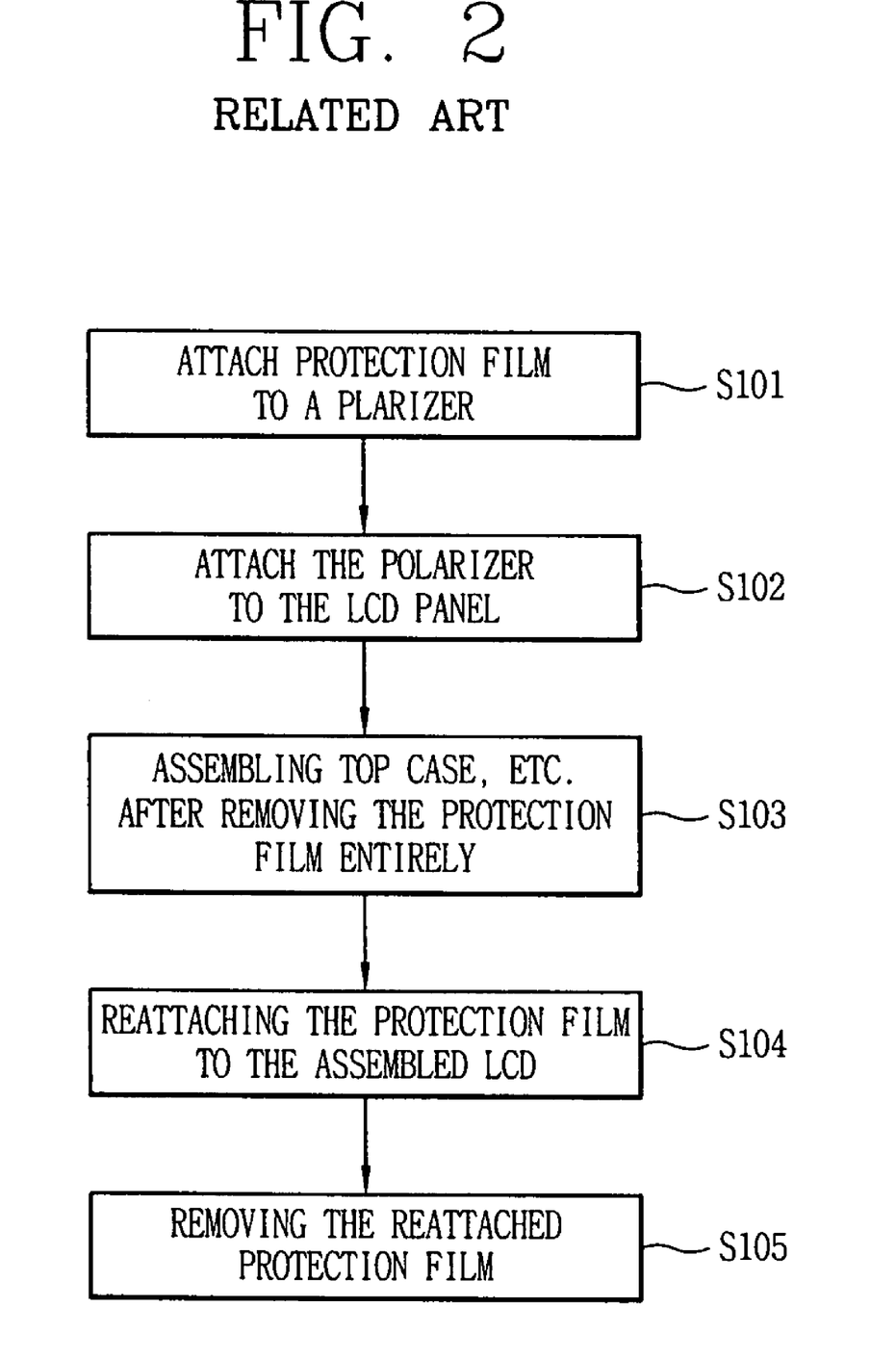
FIG. 2 is a flowchart partially showing the manufacturing process of the liquid crystal display module.

FIG. 2 is a flowchart partially showing the process for manufacturing the liquid crystal display module 10. The protection film and the release film are attached on to both surfaces of the main body before the liquid crystal display module is manufactured (S101).

After the release film of the polarizer is removed, the polarizer is then attached on to the liquid crystal panel (S102).

After the front surface protection film is removed, the liquid crystal panel, the top case, the backlight, and other components, are assembled into the liquid crystal display module (S103).

After the assembly of the liquid crystal display module is completed, a separate protection film is reattached on to the front surface of the liquid crystal display module so as to protect the polarizer by, for example, using an adhesive tape, (S104). The protection film is removed by a user (S105).

After the protection film is attached, the film is removed and then another protection film is reattached. Accordingly, in addition to the attachment process of the protection film, additional processes such as the entire separation process and the reattachment process, are required, thereby making the overall manufacturing process more complicated and increasing required time and cost.

SUMMARY

A protection film having a cutting line and a method for removing the protection film is disclosed, in which the protection film is disposed on a liquid crystal panel so as to enable a partial removal thereof during the process.

The polarizer includes a main body, a protection film on the main body, and at least one first cutting line on the protection film.

The protection film has a region corresponding to the active region of the liquid crystal panel and a dummy region outside of the active region. The cutting line may be formed on the boundary area between the active region and the dummy region.

A method for manufacturing a liquid crystal display device using the polarizer, includes providing a liquid crystal panel and a protection film having a corresponding active region and dummy region, the protection film including at least a cutting line in the dummy region or a boundary region between the active region and the dummy region; attaching the protection film to a polarizer; attaching the polarizer to a liquid crystal panel; removing the dummy region of the protection film. Removing the active region of the protection film from the liquid crystal panel may then be performed either during manufacturing or by a user.

DETAILED DESCRIPTION

Exemplary embodiments may be better understood with reference to the drawings, but these examples are not intended to be of a limiting nature. Like numbered elements in the same or different drawings perform equivalent functions. When a specific feature, structure, or characteristic is described in connection with an example, it will be understood that one skilled in the art may effect such feature, structure, or characteristic in connection with other examples, whether or not explicitly stated herein.

Figure 3:
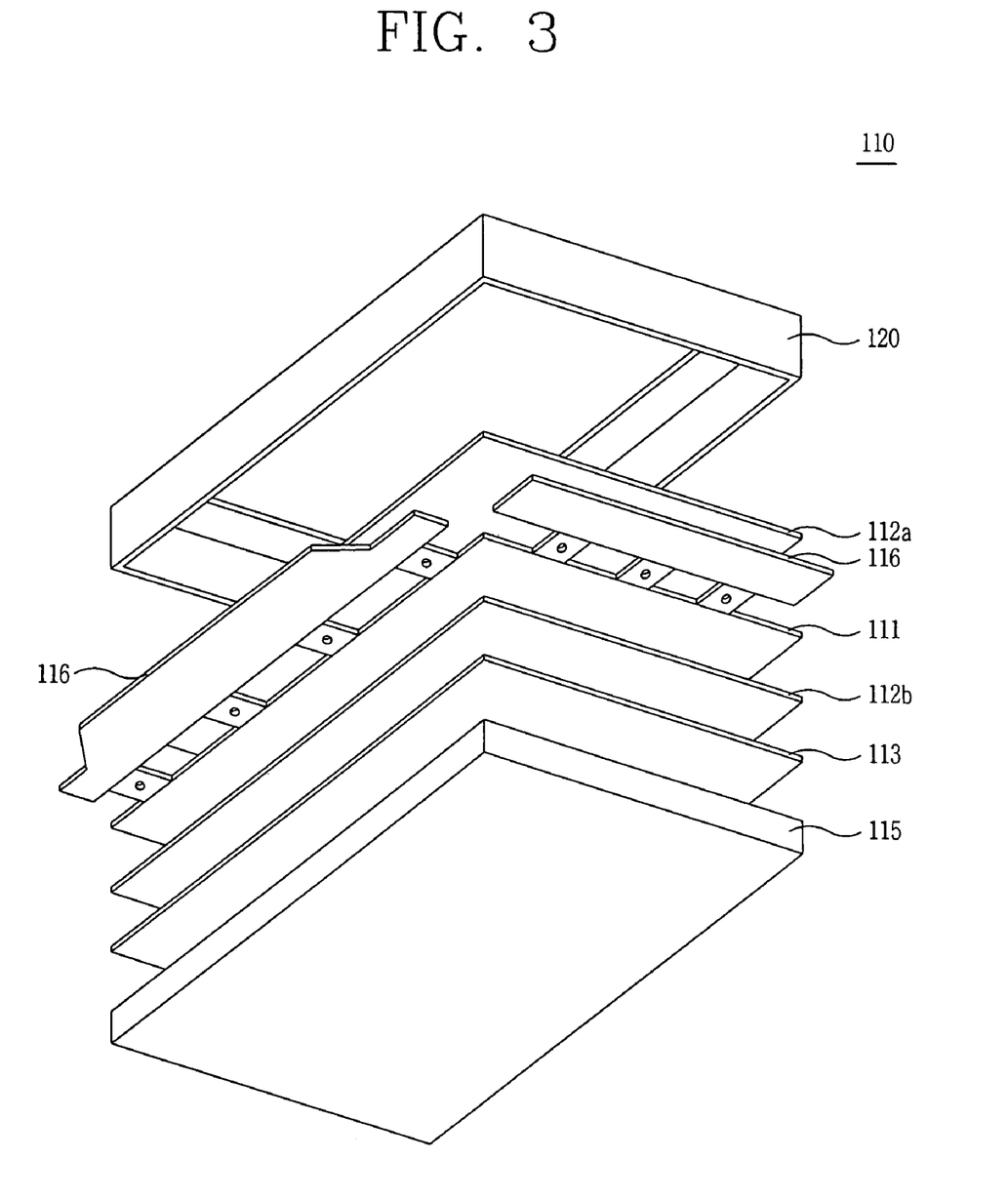
FIG. 3 is an exploded perspective view showing the liquid crystal display module.

FIG. 3 is an exploded perspective view showing a liquid crystal display module. The liquid crystal display module 110 includes a liquid crystal panel 111, a backlight unit 115 disposed below the liquid crystal panel 111 for supplying a light, a board assembly unit 116 for driving the liquid crystal panel 111, a top case 120 disposed above the liquid crystal panel 111 and arranged at an edge portion of the liquid crystal panel 111 so as to retain the liquid crystal panel 111, and an upper polarizer 112a and a lower polarizer 112b on both surfaces of the liquid crystal panel 111 for polarizing the light transmitting the liquid crystal panel 111. An optical sheet 113 is provided to improve the efficiency of light transmission between the lower polarizer 112b and the backlight unit 115.

The liquid crystal panel 111 may include (details not shown) a first substrate having a TFT array, a second substrate having color filters, and a liquid crystal layer disposed between the first substrate and the second substrate. The first substrate may include a plurality of gate lines arranged in one direction at a certain distance from each other, a plurality of data lines arranged in a direction perpendicular to each of the gate lines at a certain distance from each other, a plurality of pixel electrodes formed in a matrix shape in each pixel region where each of the gate lines and the data lines cross each other, and a plurality of thin film transistors for transferring signals of the data wires to each of the pixel electrodes by being switched due to signals of the gate wires.

The second substrate may include a black matrix for shielding light outside of the pixel region, color filters of red R, green G, and blue B for expressing various colors, and a common electrode.

Figure 4:
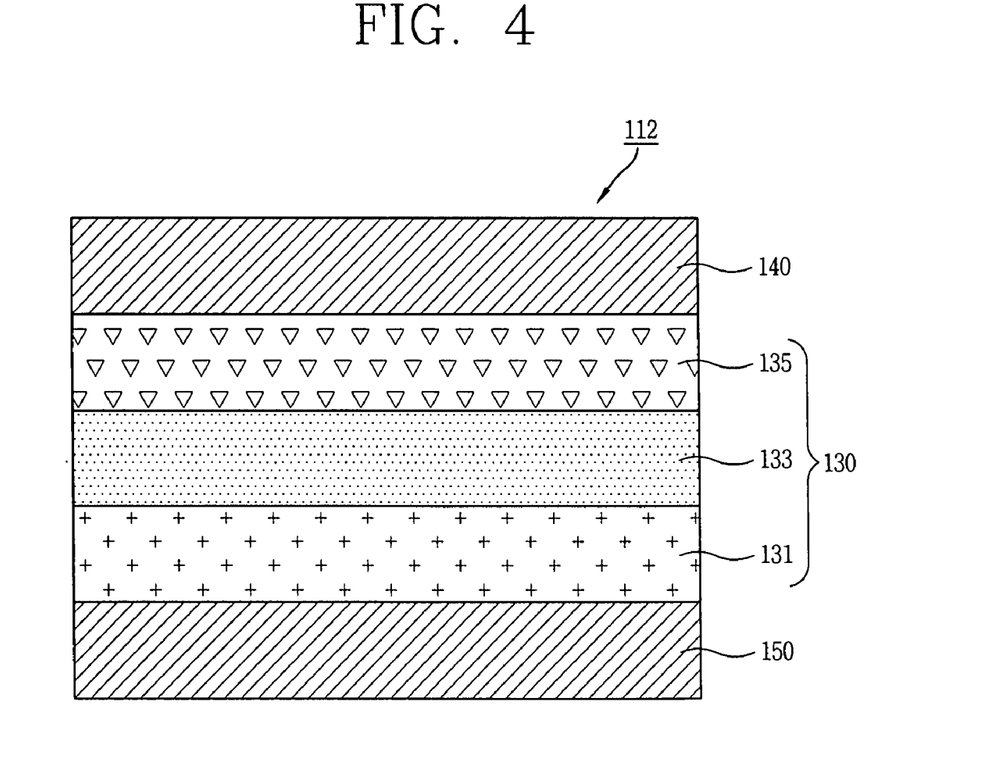
FIG. 4 is a sectional view showing the polarizer.

FIG. 4 is a sectional diagram showing the polarizer 112. The polarizer 112 may include a main body 130, and protection films 140 and 150 on the surfaces of the main body 130 so as to protect the main body 130. The main body 130 may include a Triacethyl Cellulose (TAC) layer 131, a Poly Vinyl Alcohol (PVA) layer 133, an Anti Glare Triacethyl Cellulose (AG TAC) layer 135, and the like. The main body 130 may additionally be laminated with film sheets performing other functions when needed.

Figure 5:
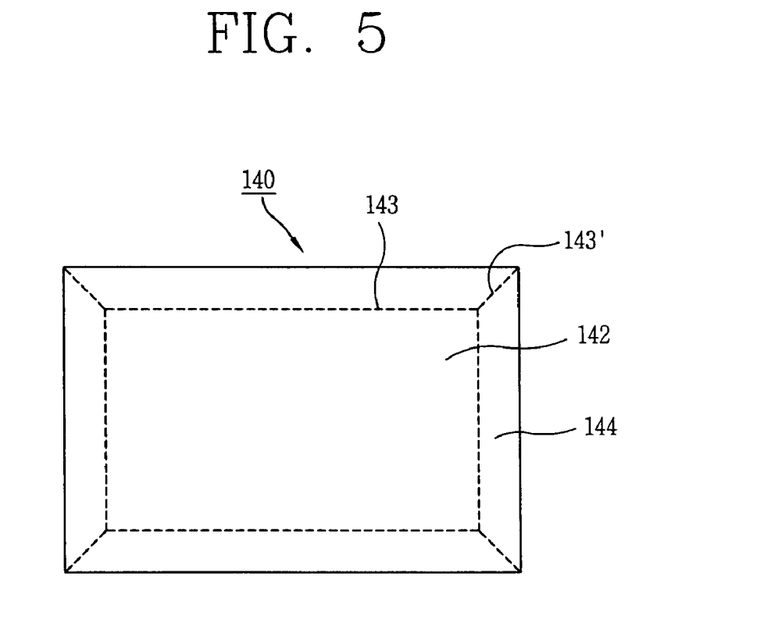
FIG. 5 is a diagram showing the protection film.

The protection film 140 includes an active region 142 and a dummy region 144 outside of the active region 142. FIG. 5 is a diagram showing the protection film 140, which is on the main body 130.

In the liquid crystal panel, the term "active region" indicates a region where an image is formed to be displayed. The term "dummy region" indicates a region where an image is not displayed, corresponding to a periphery of the active region. The dummy region 144 may be hidden by the top case that is disposed above of the liquid crystal panel when a liquid crystal display module is assembled. A first cutting line 143 is formed on a boundary area between the active region 142 and the dummy region 144. The first cutting line 143 includes a dotted line, a chain line, or the like.

The first cutting line 143 may have another shape as long as it can be separated at a later time. It should be also understood that the shape of the first cutting line or its size may be changed according to the size of the liquid crystal panel and its shape, thickness of a protection film, and the like.

As shown, the protection film is currently not separated along the cutting line 143, but some regions of the protection film may be removed (or separated) along the first cutting line 143 at a later time. (e.g., after some part of the protection film is cut along the first cutting line, a part of the protection film may be separated and removed.) That is, the cutting line 143 is formed to allow later separation of a part of the protection film from the polarizer, such as to separate the region hidden, or example, by the top case, when the liquid crystal display module is assembled.

In the liquid crystal panel attached on to the protection film 140 having the first cutting line 143, however, there is no need to remove the entire protection film 140 for an assembly of the top case. The protection film of the dummy region 144 along the cutting line 143 only needs to be removed when the module is assembled.

In this case, the protection film is also present in the active region 144, thereby protecting the active region 144. The first cutting line .143 of the protection film may be on the boundary area between the dummy region 144 and the active region 142 so as to maximize the protection of the active region 144.

Since the dummy region may be, for example, the region hidden by the top case, the main body of the dummy region can still be protected by the top case even after the protection film is removed.

The polarizer may further include at least one second cutting line 143' on is the dummy region 144. The dummy region may be divided into a plurality of surfaces by the second cutting line 143'. When the dummy region 144 is divided into a plurality of surfaces, the protection film can be separated easily, thereby facilitating removal of the protection film.

The dummy region 144 may be divided into 2 or 4 surfaces by the second cutting line 143', and may also be divided into 3 or more surfaces, as needed. When the dummy region 144 is divided into a plurality of surfaces, the cutting line 143 may be formed along the diagonal line of the main body in the dummy region 144 of the protection film. The surface of the dummy region 144 may be formed along the edge of the protection film, facilitating separation.

Figure 6:
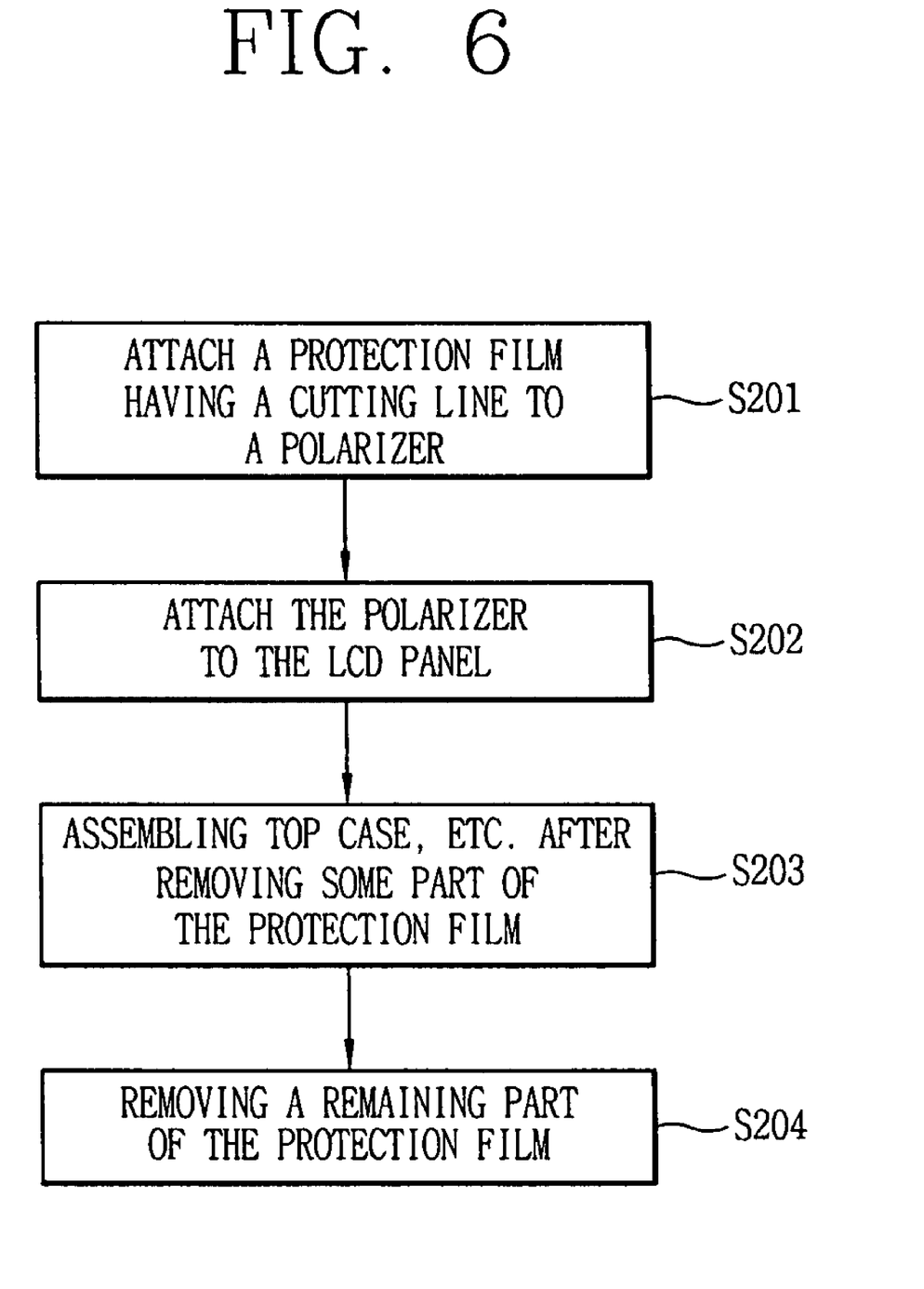
FIG. 6 is a flowchart showing the manufacturing process of the liquid crystal display device.

A method for manufacturing the liquid crystal display device using the polarizer is shown in FIG. 6. A liquid crystal panel is provided having a protection film having an active region and a dummy region. The protection film includes at least a cutting line in the dummy region or a boundary area between the active region and the dummy region. The protection film is attached on to a polarizer (S201).

The polarizer having the protection film may be attached to a liquid crystal panel (S202).

The dummy region of the protection film is removed (hereinafter, referred to as "a first removing") along the cutting line, and the liquid crystal panel then assembled with the top case, and other components, thereby forming the liquid crystal display device (S203).

A user or a buyer can remove (hereinafter, referred to as "a second removing") the protection film of the active region, to thereby use the liquid crystal display device (S204). It may not be necessary to perform the "second removing" in order to use the liquid crystal device.

The cutting line is formed so as to remove the some part of the protection film, leaving the protection film in the active region. However, without being limited to the active region, if there is a region where protection is needed, the separation region of the protection film may be formed in another region except the region for the protection.

Figure 7A:
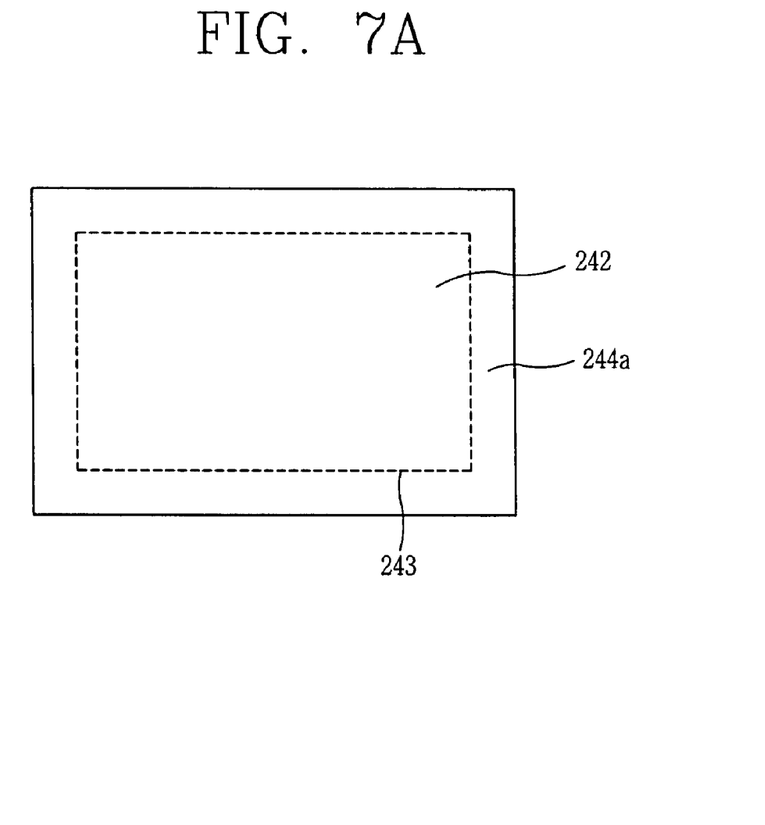
FIG. 7a and 7b are diagrams showing a first example in the method for manufacturing the liquid crystal display device.
Figure 7B:
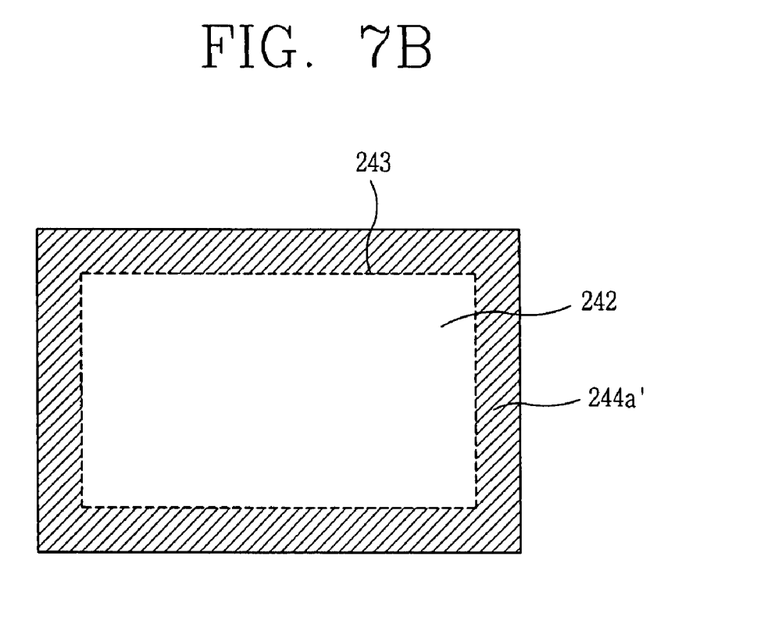
Figure 8A:
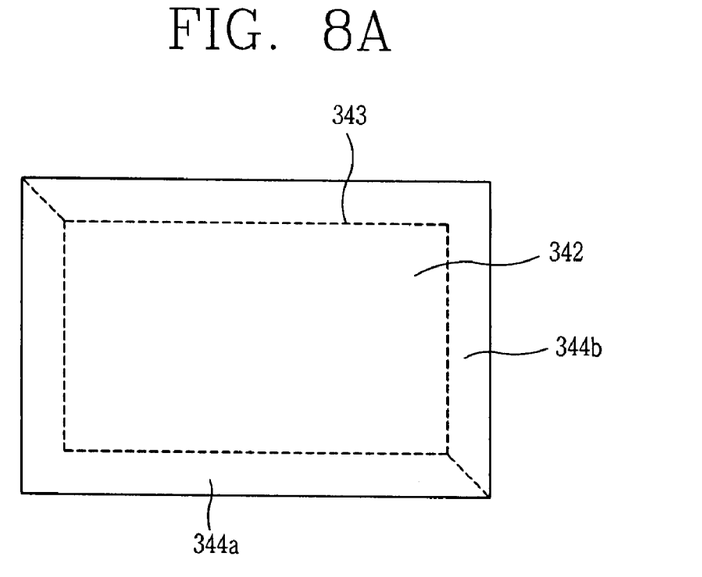
FIGS. 8a through 8c are diagrams showing a second example in the method for manufacturing the liquid crystal display device.
Figure 8B:
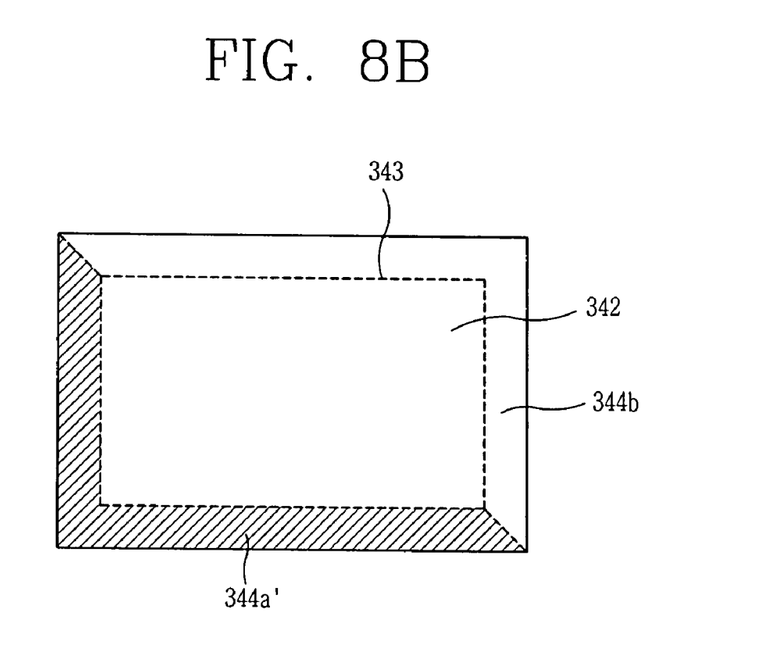
Figure 8C:
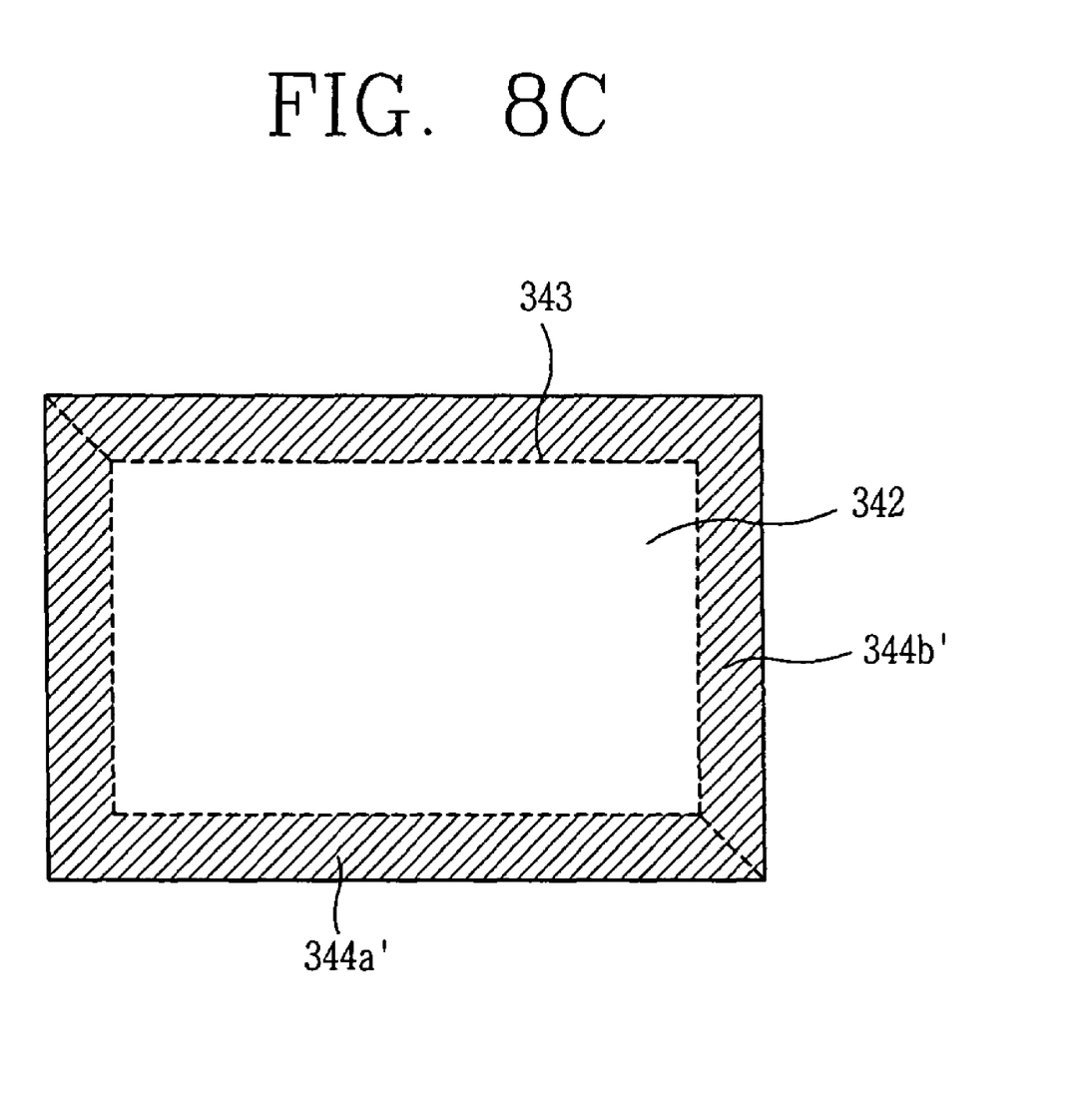
Figure 9A:
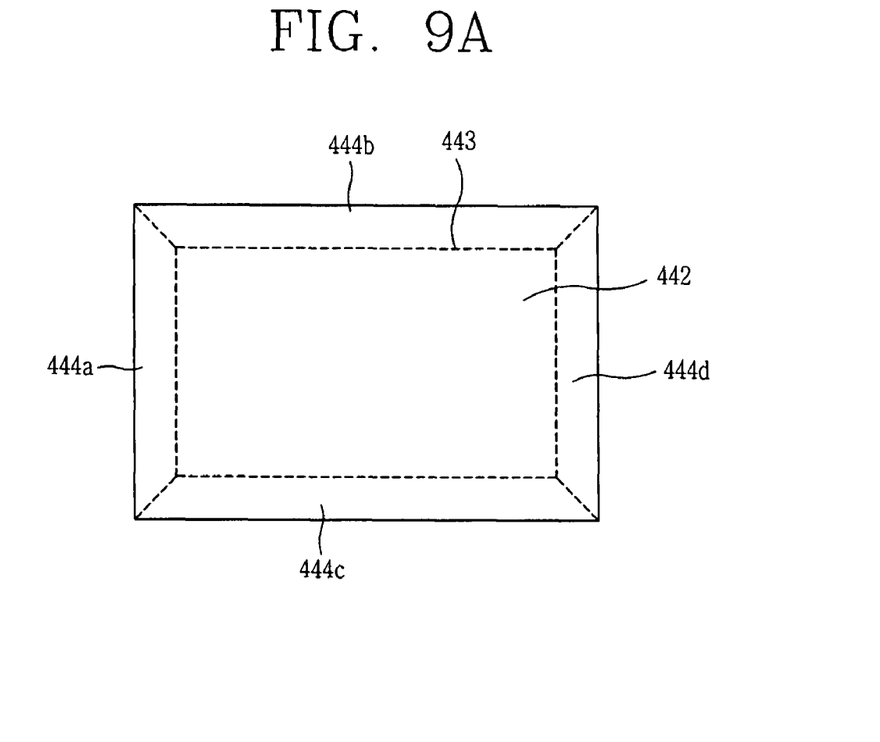
FIGS. 9a through 9e are diagrams showing a third example in the method for manufacturing the liquid crystal display device.
Figure 9B:
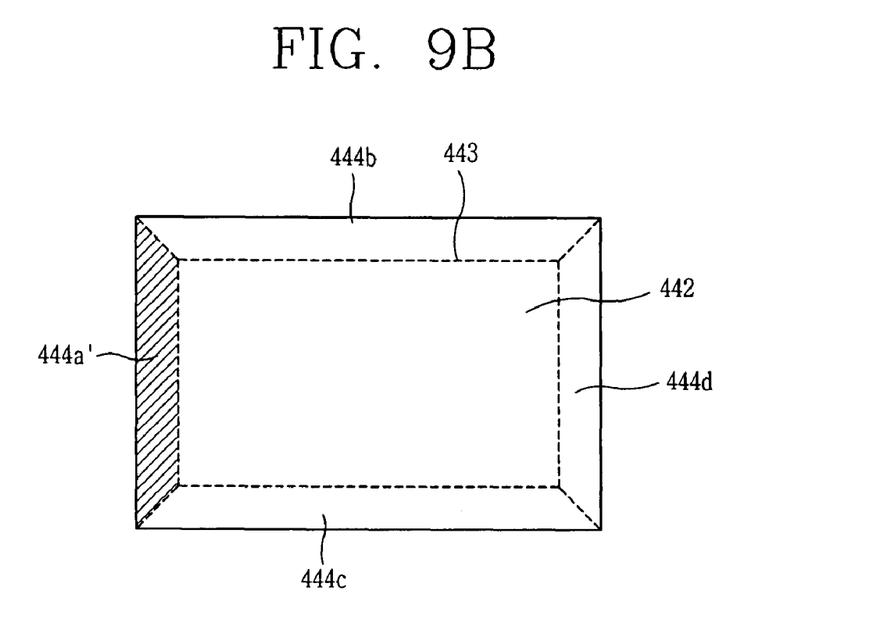
Figure 9C:
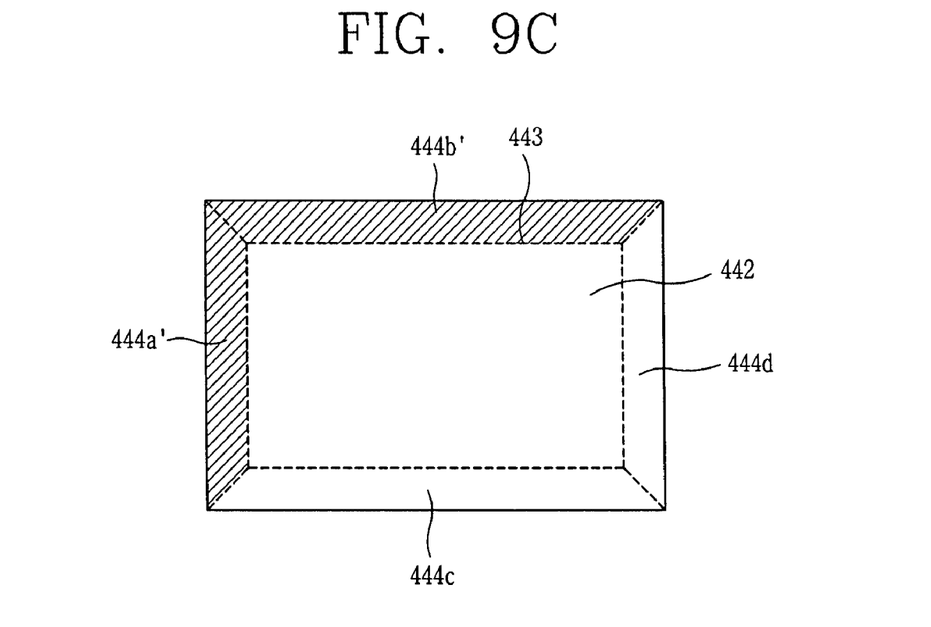
Figure 9D:
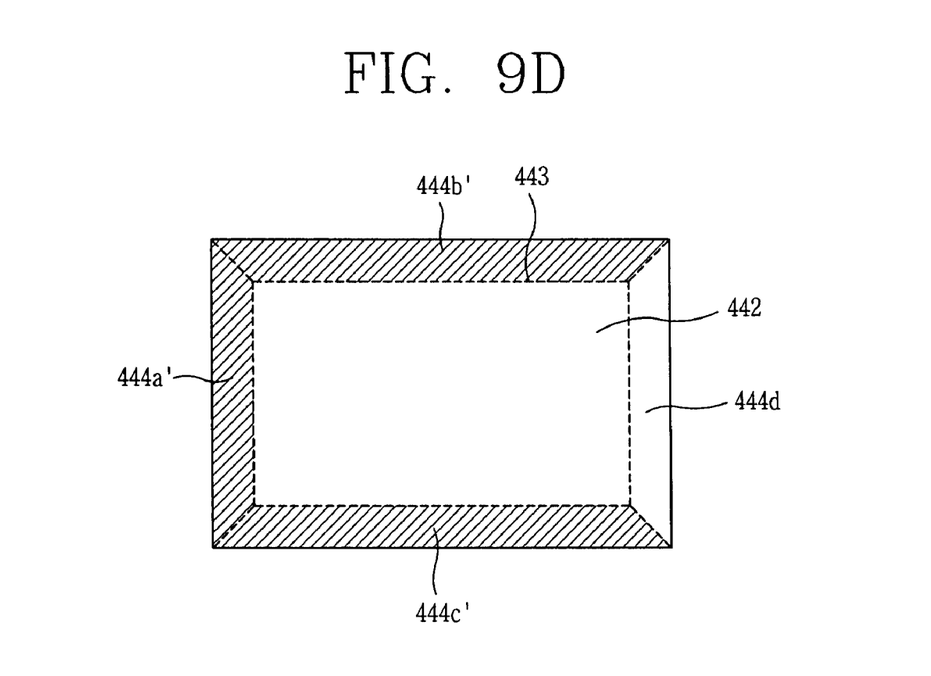
Figure 9E:
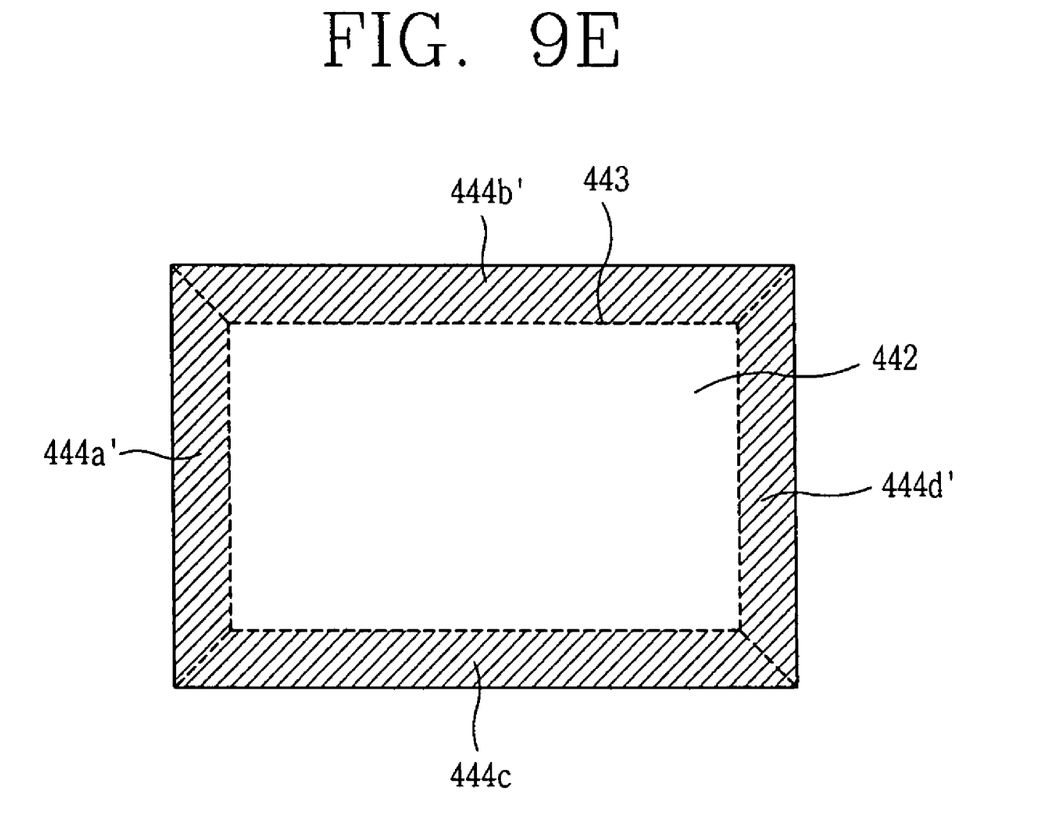

FIGS. 7a and 7b show the first example of the first removing in the method for manufacturing the liquid crystal display device. The protection film is divided into an active region 242 and a dummy region 244a, and a cutting line 243 is formed on a boundary area between the active region 242 and the dummy region 244a. As shown in FIG. 7b, if the first removing, which removes the dummy region 244a along the cutting line 243 except the active region 242, is performed, a state 244a', in which the active region 242 has the protection film but the dummy region does not have the protection film results. FIGS. 8a through 8c show the second example of the first removing in the method for manufacturing the liquid crystal display device. The second example shows that the dummy region is divided into two surfaces 344a and 344b, and the cutting line 343 is further formed along the diagonal line of the main body in the dummy region 344. The protection film is divided into one active region 342 and two dummy regions 344a and 344b by the cutting line 343 (FIG. 8a).

When a plurality of dummy regions is formed, the dummy region 344 may be separated along the cutting line 343. Referring to FIGS. 8b and 8c, if the dummy region 344 is to be respectively separated, each of the dummy regions is shown as the regions 344a' and 344b' without having the protection film.

FIGS. 9a through 9e show the third example that divides the dummy region into 4 regions. The third example may the same as the first and the second examples in the separation method and sequence. The order sequence of removing each dummy region is not restricted. The dummy regions may be separated in a different order, as needed, or may be separated together.

While the methods disclosed herein may have been described and shown with reference to particular steps performed in a particular order, it will be understood that these steps may be combined, sub-divided, or reordered to from an equivalent method without departing from the teachings of the present invention. Accordingly, unless specifically indicated herein, the order and grouping of steps is not a limitation of the present invention.

The present invention may be embodied in several forms without departing from the essential characteristics thereof. For instance, the protection film of the present invention is mainly described to be formed on the upper polarizer of the liquid crystal panel, however, may also be formed on the lower polarizer thereof.

Therefore, the features herein should be construed broadly within its scope as defined in the appended claims, and therefore all changes and modifications that fall within the metes and bounds of the claims, or equivalence of such metes and bounds are therefore intended to be embraced by the appended claims.

What is claimed is:

1. A method for manufacturing a liquid crystal display device, the method comprising:
   providing a liquid crystal panel and a polarizer having a main body for polarizing incident light and a protection film having an active region and a dummy region surrounding the active region, the protection film including a cutting line along the boundary between the active region and the dummy region, the protection film being disposed directly on the main body;
   attaching the protection film to a polarizer;
   removing the dummy region of the protection film from the polarizer, exposing a dummy area of the polarizer;
   assembling the liquid crystal display panel and a top case to cover the dummy area of the polarizer and form the liquid crystal display module;
   supplying the assembled liquid crystal display module to a user; and
   removing directly the action region of the protection film by the user.

* * * * *